3,047,514
METHOD FOR MANUFACTURING AN ACTIVE
CATALYST COMPOSITION
Emmett H. Burk, Jr., Hazel Crest, and John Mooi, Homewood, Ill., assignors, by mesne assignments, to Engelhard Industries, Inc., Newark, N.J., a corporation of Delaware
No Drawing. Filed Aug. 7, 1959, Ser. No. 832,131
10 Claims. (Cl. 252—442)

This invention relates to a process for preparing a supported catalyst of the type described in the copending application of Keith and Burk, Serial No. 683,931, filed September 16, 1957, which includes an activated or gamma-alumina supporting material, a noble metal, and an aluminum halide Friedel-Crafts component. More particularly, the present invention is concerned with a process for manufacturing such a catalyst in which the aluminum halide Friedel-Crafts component is added to a noble metal-alumina composition by producing the Friedel-Crafts component from a non-aqueous solution of a lower alkyl aluminum compound and a halogenating agent.

In a process described in the copending application of John L. Gring, Serial No. 712,316, filed January 31, 1958, and now abandoned, the catalyst can be prepared by adding the aluminum halide Friedel-Crafts component to a noble metal-alumina composition from a non-aqueous solution. Before the catalyst is employed in a hydrocarbon conversion process, e.g. isomerization of $C_4$ to $C_9$ n-paraffinic-containing hydrocarbon materials, it is usually pretreated with free or molecular hydrogen or a mixture of hydrogen and hydrogen halide at a temperature of, for instance, 650° F. Although this hydrogen pretreatment appears to favorably affect the activity of the catalyst, it is desirable to employ lower temperatures in the pretreatment to avoid undue loss of aluminum halide by sublimation even though this may decrease the rate of activation. Some cracking of the components in the non-aqueous solution by the aluminum halide results during the addition of the aluminum halide per se in this manner. Accordingly, the resulting catalyst frequently contains some high boiling carbonaceous material which cokes and contaminates the catalyst during the pretreatment operation. In contrast to this procedure, however, when following the process of the present invention, a catalyst exhibiting favorable activity can be provided with the obviation of the pretreatment procedure. In further contrast to this procedure, our process also (1) results in a catalyst free of coke deposits formed, and eliminates the loss of aluminum halide, during the pretreatment operation and (2) allows a higher chloride level on, thus higher activity and good aging characteristics for, the catalyst. This higher chloride content is believed to be due to the higher solubility of the lower alkyl aluminum compound, e.g. aluminum alkyl or aluminum sesquihalide, in comparison to the aluminum halide per se in the non-aqueous solution.

As described in the above-copending application, the catalyst includes catalytically effective amounts of a noble or platinum group metal, an aluminum halide Friedel-Crafts component and, at least ultimately in the isomerization system, a hydrogen halide, all of which are supported on an alumina base. The base is usually the major component of the catalyst, constituting about 40 to 95 weight percent, preferably at least about 50 percent. The catalyst base is an activated or gamma-alumina such as those derived by calcination of amorphous hydrous alumina, alumina monohydrate, alumina trihydrate or their mixtures. The catalyst base precursor most advantageously is a mixture predominating in, or containing a major proportion of, for instance, about 65 to 95 weight percent, one or more of the alumina trihydrates bayerite I, bayerite II (randomite) or gibbsite, and about 5 to 35 weight percent of alumina monohydrate (boehmite), amorphous hydrous alumina or their mixture. The alumina base can contain small amounts of other solid oxides such as silica, magnesia, boria, natural or activated clays (such as kaolinite, montmorillonite, halloysite, etc.), titania, zirconia, etc., or their mixtures.

The catalyst generally contains about 0.01 to 2 weight percent, preferably about 0.1 to 0.75 weight percent, of one or more of the platinum metals of group VIII, that is, platinum, palladium, rhodium, ruthenium, osmium or iridium. The small amount of noble metal may be present in the metallic form or as a sulfide, oxide or other combined form. The metal may interact with other constituents of the catalyst, but if during the use the noble metal be present in metallic form then it is preferred that it be so finely divided that it is not detectable by X-ray diffraction means, i.e. that it exists as crystals of less than 50 Angstrom units size. Of the noble metals, platinum is preferred.

The aluminum halide Friedel-Crafts component usually is about 5 to 50 weight percent, preferably about 10 to 30 weight percent, of the catalyst and this component can be for instance, $AlCl_3$, $AlBr_3$ and similar metal halides where one or more of the anions are replaced with another anion such as hydroxide. Mixtures of these Friedel-Crafts components can also be used; aluminum chloride is, however, the preferred Friedel-Crafts component.

Another component of the catalyst may be a hydrogen halide and the catalyst may advantageously contain about 0.5 to 15% or more of a hydrogen halide. The hydrogen halides include, for instance, hydrogen chloride, hydrogen bromide, and their mixtures and preferably the amount of this component on the alumina base is less than about 10 percent of the catalyst. Although the components of the catalyst can vary, as illustrated above, the preferred catalyst produced by the process of our invention contains platinum and aluminum chloride deposited on activated alumina.

It is highly desirable to keep the catalyst protected from moisture to avoid hydrolysis and deactivation of the aluminum halide component. Thus, it is most advantageous to prepare and employ this catalyst under essentially anhydrous conditions including the provision of a hydrogen halide in anhydrous form.

The process of the present invention includes adding the aluminum halide Friedel-Crafts component to a noble metal-gamma alumina composition by producing the Friedel-Crafts component from a non-aqueous solution of a lower alkyl aluminum compound and a halogenating agent in the presence of the noble metal-alumina composition. The lower alkyl aluminum compound can have one, two or three, e.g. trialkyl, lower alkyl radicals of about 1 to 7 carbon atoms each and, each alkyl radical can be either a branch chain or straight chain structure. Some of the specific lower alkyl aluminum compounds include tripropyl aluminum and triisobutyl aluminum. The alkyl aluminum compound can be employed as such or be an aluminum sesquihalide, e.g. aluminum sesquichloride. The noble metal, e.g., platinum, gamma alumina composition employed in this process can be prepared by known procedures. For instance, the platinum metal component can be deposited on a calcined or activated alumina, but it is preferred to add the platinum metal component to the alumina hydrate base precursor. Thus, platinum can be added through reaction of a halogen platinum acid, for instance, fluoro-, chloro-, bromo- or iodo-platinic acid, and hydrogen sulfide in an aqueous slurry of the alumina hydrate. The hydrogen sulfide can be employed as a gas or an aqueous solution. Alternatively, the platinum component can be provided by mixing an aqueous platinum sulfide sol with the alumina hydrate. This sol can be made by reaction in an aqueous medium of a halogen platinic acid with hydrogen sulfide. The alumina hydrate containing the platinum metal can be dried to a powder, mixed with water to form a moistened material, extruded and calcined usually at a temperature from about 750 to 1200° F. or more to provide the activated or gamma-alumina modifications. The addition of the Friedel-Crafts component to the high area catalyst bases of U.S. Patent No. 2,838,444, described below, has been found to decrease the surface area, for instance, directionally related to the amount of Friedel-Crafts component added. Use of the catalyst in an isomerization system or hydrogen pretreatment increases the area apparently through loss of the Friedel-Crafts component.

The preferred base or supporting material for the noble metal is an activated or gamma-alumina made by calcining a precursor predominating in alumina trihydrate. An alumina of this type is disclosed in the above-mentioned patent. The alumina base is derived from a precursor alumina hydrate composition containing about 65 to 95 weight percent of one or more of the alumina trihydrate forms gibbsite, bayerite I and bayerite II (randomite) as defined by X-ray diffraction analysis. The substantial balance of the hydrate is amorphous, hydrous or monohydrate alumina. Trihydrates are present as well-defined crystallites, that is they are crystalline in form when examined by X-ray diffraction means. The crystallite size of the precursor alumina trihydrate is usually in the 100 to 1000 Angstrom unit range. The calcined alumina has a large portion of its pore volume in the pore size range of about 100 to 1000 Angstrom units generally having about 0.1 to about 0.5 and preferably about 0.15 to about 0.3 cc./g. of pore volume in this range. As described in U.S. Patent No. 2,838,444, the calcined catalyst can be characterized by large surface area ranging from about 350 to about 550 or more square meters per gram when in the virgin state as determined, for example, by the BET adsorption technique. A low area catalyst prepared by treating the predominantly trihydrate base precursor is described in U.S. Patent No. 2,838,445. This base when in the virgin state has substantially no pores of radius less than 10 Angstrom units and the surface area of the catalyst is less than 350 square meters per gram and most advantageously is in the range of about 150 to 300 square meters per gram.

In the process of the present invention, a mixture of a noble metal-activated alumina composition, a non-aqueous solvent, and a lower-alkyl aluminum compound is formed and the resulting mixture is contacted with a halogenating agent to provide reactive halogen, i.e. halogen which will react with the lower alkyl aluminum compound, to convert the lower alkyl aluminum compound to aluminum halide. The mixture is prepared under conditions sufficient to maintain the solvent in the liquid phase, i.e. below the solvent boiling point, under the pressure employed. Generally this temperature will be from about 40° F. to 350° F., preferably from about 85° F. to 160° F., while the pressure can generally be up to about 50 atmospheres, e.g. about 1 to 50 atmospheres, but preferably from about 1 to 2 atmospheres. This treatment is continued for a period of time sufficient to allow deposition of the desired amount of the alkyl aluminum compound on the composition. The solvent can be removed, e.g. evaporated before or after halogenation or even later when hydrogen halide is added to the catalyst composite in an inert, e.g. $N_2$, gas stream. The resulting noble metal-alumina-alkyl aluminum composition is generally treated with a, preferably anhydrous, halogenating agent to provide reactive halogen under halogenating conditions to produce a noble metal-aluminum halide-alumina composition. The halogenating conditions of temperature, pressure and WHSV (weight of reactive halogen per hour per weight of aluminum) depend upon the specific halogenating agent being employed; however, the temperatures will generally be from about −20° F. to 500° F. but preferably from about 15° F. to 380° F. at pressures generally from about 0.1 mm. to 35,000 mm. Hg absolute but preferably from about 2 to 4000 mm. Hg absolute. The WHSV can generally be from about 0.3 to 8 and preferably from about 0.75 to 4.

Although the nature of contacting the components employed in this process is largely dependent upon the equipment available, another embodiment of this process includes adding the solvent to a container followed in succession by the addition of the noble metal-alumina composition and the alkyl-aluminum component, and introducing reactive halogen to the resulting mixture. However, according to an advantageous embodiment, the noble metal-alumina composition is added to a container which is placed under a vacuum generally of less than about 100 mm. Hg. The source of evacuation is controlled to maintain the vacuum, the solvent is added, the vacuum is broken, and the alkyl-aluminum compound is added. This advantageous procedure provides for uniform solvent distribution in the pores of the noble-metal-alumina composition. The resulting composite can be treated with a halogenating agent, to provide reactive halogen, which may be conducted to the composite by a gas, e.g. hydrogen or nitrogen.

The amount of solvent employed in this process can vary over wide limits, however, it is generally an amount suitable for at least a partial solvation of the alkyl-aluminum compound. The solvent can be any number of materials in which the alkyl aluminum compound is soluble and which will operate under the conditions employed in this process. It must be substantially chemically inert to the alkyl aluminum compound and noble metal-alumina components under the process conditions, that is, the solvent must not react chemically with these components beyond the formation of loose complexes. Suitable solvents in this class, conveniently referred to hereinafter in the specification and claims as "alkyl-aluminum solvent," include low boiling saturated organic solvents containing from about 1 to 12 carbon atoms, e.g. paraffins containing from about 4 to 12 carbon atoms. Among the specific solvents suitable for use in this process are pentane, hexane, heptane or mixtures thereof. Thus, the liquid solvent is essentially non-aqueous or organic and preferably is a paraffin hydrocarbon containing from about 5 to 12 carbon atoms.

The halogenating agent for providing reactive halogen can be selected from numerous compounds containing one or more halogens. These compounds hereinafter designated "alkyl-aluminum halogenating agents" in the specification and claims, will encompass elemental halogens, hydrogen halides, alkyl halides, and ammonium halides and other non-aromatic halogenating agents. Among the specific aluminum halogenating agents suitable for use in our process are hydrogen chloride, hydrogen bromide, 1,1,1-trichloroethane, 1,2,2-trichloroethylene, ethylene dichloride, chlorine, bromine, ethylene chlorobromide, carbon tetrachloride, "Freon-11" ($CCl_3F$), ammonium chloride, and carbon tetrachloride in combination with hydrogen. Preferably, the organic halogenating agents do not contain more than about 6 carbon atoms. Our process can be conducted in a vessel designed to substantially avoid contamination of the feed materials. Alternatively, when the catalyst is destined for use in a conversion process such as the isomerization of $C_4$ to $C_9$ n-paraffinic-containing hydrocarbon materials, the noble metal-alumina-alkyl-aluminum composition can be subjected to the halogenating agent in the isomerization reactor to provide the noble metal-alumina-aluminum halide composite.

In an embodiment of the process of the present invention, the activity, e.g. isomerization activity, of the noble-metal-aluminum halide-alumina catalyst prepared in accordance with the process of the present invention may be further enhanced by heating. For instance, by heating in a non-oxidizing gas, e.g. free hydrogen or nitrogen, preferably hydrogen, atmosphere at temperatures generally from about 400° F. to 700° F. and preferably from about 450° F. to 650° F., at pressures generally up to about 2000 p.s.i.g., and usually from atmospheric pressure to about 2000 p.s.i.g., but preferably from about 250 to 500 p.s.i.g., and an activation gas velocity generally of about 1000 volumes of gas per volume of catalyst per hour (VHSV) or less e.g. to one VHSV and preferably about 100 to 300 VHSV but usually about 200 VHSV. It may be desirable to employ the lower temperature to avoid undue loss of aluminum halide by sublimation even though this may decrease the rate of activation, however, at higher pressures higher temperatures can be employed. The rate of flow of this gas is dependent to some extent on the temperature employed, due to the increase in vapor pressure of the aluminum chloride with temperature. This heating process is conveniently continued until the conversion activity of the catalyst is generally enhanced to at least about 60 weight percent but preferably at least about 70 weight percent for pentane.

A hydrogen halide component can be added to the noble-metal-alumina-aluminum halide composite by supplying the hydrogen halide as such or by employing an organo-halogen compound or other substance which will produce the hydrogen halide. The hydrogen halide can be added separately to the reaction system, in the hydrogen-containing recycle gases or in the n-paraffin feedstock. Also, the hydrogen halide on the alumina base might be added to the catalyst before charging it to the reactor. When using the catalyst in a conversion process, however, such as the isomerization of $C_4$ to $C_9$ n-paraffinic-containing hydrocarbon materials, the hydrogen halide can be added to the noble metal-Friedel-Crafts-alumina composite after it is placed in the isomerization reactor. Conveniently, this is done by including in the n-paraffin feed about 0.05 to 35 weight percent, advantageously about 0.5 to 5 weight percent, of the hydrogen halide or of a hydrogen halide-producing material. The addition of the hydrogen halide in these concentrations based on the n-paraffin is continued over the processing period in order to maintain an adequate concentration of this component on the alumina base and insure the stability of the catalyst against undue aging.

When using an organo-halogen compound or other substance as the hydrogen halide supplier it can also be employed to conveniently supply the hydrogen halide to the catalyst composite under conditions to which the catalyst may be subjected. Suitable hydrogen halide precursors include the elemental halogens, chlorine, bromine and mono- and polyhalo-alkanes such as carbon tetrachloride, chloroform and tertiary butyl chloride; or other available materials which will be converted under the conditions of the process in which the catalyst is used, for instance when under isomerization conditions of free hydrogen and temperatures of about 150 to 450° F., to obtain the hydrogen halide.

The following specific examples will serve to illustrate the invention but they are not to be considered limiting.

EXAMPLE I

*Preparation of Noble Metal-Alumina Composition*

(A) A noble metal-alumina composition of the kind described in U.S. Patent No. 2,838,444 can be employed in preparing the catalyst used in the process of our invention. The composition of this application can be made as follows. Pure aluminum metal is dissolved in pure hydrochloric acid, and the resulting solution is mixed with deionized water to form an aqueous aluminum chloride solution and an alumina gel is prepared equivalent to approximately 65 grams of $Al_2O_3$ per liter. A separate deionized water solution of $NH_4OH$ is prepared containing approximately 65 grams of ammonia per liter. These two reagents in approximate volume ratio of 1:1 are intimately mixed as a flowing stream at a pH of 8.0. The flowing stream is passed to a stoneware container and an alumina hydrate is visible. The precipitated hydrate is filtered from the mother liquid and washed to <0.2% chloride by successive filtrations and reslurryings in deionized water until the desired chloride concentration is reached. In each reslurrying ammonia is added to give a pH of about 9. The washed hydrate is covered with water in a container and aged at about 90° F. until it is approximately 70% trihydrate, the remaining being substantially of the amorphous or monohydrate forms. The total hydrate composition is comprised of 42% bayerite, 18% randomite, 11% gibbsite, 20% boehmite, and 9% amorphous as determined by X-ray diffraction analysis. The aged hydrate is mixed with deionized water in a rubber lined container to provide a slurry of about 7 weight percent $Al_2O_3$ at a pH of about 8.0. A chloroplatinic acid solution in deionized water (0.102 gram platinum per milliliter) is stirred into the slurry and the slurry is then contacted with a deionized water solution which has been saturated with $H_2S$ at 78° F. to precipitate the platinum. The pH of the slurry is adjusted to 6.0 to 6.5 by ammonium hydroxide addition and the solids of the slurry are dried on a horizontal drum drier to give a powder of generally less than 20 mesh. The drum dried powder is mixed in a planetary type dough beater with sufficient deionized water to indicate 26 weight percent water on a Central Scientific Company infra-red moisture meter containing a 125 watt bulb, Cat. No. 26675. The resulting mixture is forced through a die plate having holes 1/16" in diameter bolted to a 3½" Welding Engineers screw extruder. The resulting strands are broken to particles of length varying generally between about 1/16" to 1".

The particles are dried at 230° F. and calcined by heating to 925° F. in a flow of nitrogen gas followed by a flow of air while the composition is maintained at a temperature in the range of 865° to 920° F. The composition thus produced analyses about 0.6 weight percent of platinum which is in sufficiently divided form so as to exhibit by X-ray diffraction studies the substantial absence of crystallites or crystals of size larger than 50 Angstrom units. After the calcination the composition has an area (BET method) within the range from about 350 to 550 square meters/gram.

(B) A platinum-alumina composition prepared essentially as described above, except that air was used for the complete calcination procedure and containing about 0.6% platinum was employed in preparing the noble metal-aluminum halide alumina catalyst by the following procedure.

A 500 ml. 3-neck flask was fitted with inlet and outlet tubes and a dropping funnel. The flask was swept out with prepurified nitrogen. 100 grams of the platinum-alumina catalyst were placed in the flask and swept out with prepurified nitrogen. 180 ml. of dry n-hexane were added. Inlet and outlet tubes were blocked and the flask was transferred to a nitrogen-filled dry box. 50 grams of triisobutyl aluminum were added rapidly dropwise from the dropping funnel while the flask was shaken vigorously. About 3 or 4 minutes were required for the addition. The dropping funnel was removed and a thermometer put in its place. The temperature of the mixture was 138° F. The flask was removed from the dry box and the inlet attached to a source of nitrogen and hydrogen chloride gases. Nitrogen flow was started through the flask at 1750 cc./min. Hydrogen chloride was admitted (with the nitrogen) at a rate of about 5000 cc./min. (4 WHSV). The flask was shaken. After about 10 mins. the hexane had evaporated, the temperature rose and HCl flow was shut off. The flask was attached to the Syntron "Paper Jogger" to supply agitation after the catalyst was visibly dry. Hydrogen chloride was added periodically at such a rate as to keep the temperature of the catalyst in a range from 160° to 220° F. from the heat evolved due to the interaction of the hydrogen chloride and the triisobutyl aluminum. When this temperature could no longer be maintained it was assumed that reaction was complete and hydrogen chloride addition was stopped. Two hours of periodic HCl additions were required. Nitrogen flow during this time was continuous at 1750 cc./min. The catalyst was transferred under nitrogen flow to a moisture-tight bottle. 12.7 grams were recovered. Analysis showed 15.55% chloride and 0.446% Pt.

EXAMPLE II

A platinum-alumina composition prepared essentially as described above in Example I(A), was employed in preparing the noble metal-aluminum halide-alumina catalyst by the following procedure.

A solution of aluminum sesquichloride was prepared by dissolving 20 grams of $Al(C_2H_5)_3$ in 250 ml. of dry hexane. 23.4 grams of granular $AlCl_3$ were added in small portions and the solution was shaken between additions. These steps were carried out in a nitrogen-filled dry box. Solution of the aluminum chloride was not immediate, but was complete when the mixture was allowed to stand overnight.

The platinum-alumina composition used for the preparation had been previously reduced by calcination in hydrogen flowing at 1000 VHSV, atmospheric pressure, 17¾ hours at 900° F. 50 grams of the platinum-alumina composition were weighed into a 500 ml. 3-neck flask under ambient conditions. The flask was attached through one neck to a mechanical vacuum pump and through another neck to a 250 ml. buret. The third neck was used for a thermometer. Pressure in the flask was reduced to 0.00025 atmosphere. The buret was swept out with prepurified nitrogen. 65 ml. of the aluminum sesquichloride solution, described above, were placed in it and protected from air with prepurified nitrogen. The solution was allowed to run from the buret to the catalyst while the catalyst was shaken vigorously and pumping was continued. Vacuum was broken by admitting prepurified nitrogen to the flask. The buret was removed and a source of nitrogen and hydrogen chloride gases attached. Nitrogen flow was started through the flask at 12.5 l./hr. and hydrogen chloride flow added to it at about 30 l./hr. (0.8 WHSV). This gas flow over the catalyst was maintained for 3 hours and removed solvent. Temperature during the halogenating period rose at first to 120° F. and fell to 95° F. at the end of the three hours. Hydrogen chloride flow was stopped and the excess HCl was swept from the flask using a high flow of nitrogen. The catalyst was transferred to a moisture-tight bottle under a nitrogen flow. Recovery was 62 g. Analysis showed 13.9% chloride.

EXAMPLE III

Isomerization data are presented below for catalysts prepared in accordance with the present invention. Tests, run No. 1, employing substantially the catalyst prepared in Example I above, and run No. 2, employing substantially the catalyst prepared in Example II above, demonstrate the excellent activity and selectivity in the isomerization of n-pentane.

A catalyst, prepared essentially in the same manner as the catalyst used in run No. 1, was employed in run No. 3. However, the catalyst of run No. 3 was subjected to flowing hydrogen in the reactor for a period of 3 hours at a temperature of 500° F. and a pressure of 1 atmosphere before it was tested for isomerization activity. The test data for run No. 3 presented below shows that the isomerization activity of the catalyst employed in run No. 1 may be further enhanced when subjected to heat. In runs Nos. 1, 2, and 3, hydrogen and dried pure grade n-pentane (99.9% n-pentane, 0.1% i-pentane) containing 5% by weight carbon tetrachloride, as a hydrogen chloride yielding agent, are charged into a 1″ I.D. reactor unit. The conditions and results for the tests are set forth below.

TEST DATA

| Run No. | 1. (899-31) | 2. (960-31) | 3. (899-31) |
|---|---|---|---|
| Catalyst No. | 480-413 | 480-280 | 480-333 |
| Feed | p.g. pentane+5% $CCl_4$ by wt. | | |
| Conditions: | | | |
| Temp., °F. | 250 | 250 | 250 |
| Pressure p.s.i.g. | 300 | 300 | 300 |
| WHSV | 4.92 | 4.92 | 4.92 |
| Mole Ratio, $H_2/H'C$ | 5.01 | 5.06 | 5.07 |
| Product dist., Wt. percent: | | | |
| $C_1$ | | | |
| $C_2^=$ | 0.06 | | |
| $C_2$ | .04 | 0.03 | |
| $C_3^=$ | | | 0.04 |
| $C_3$ | | | |
| $C_4^=$ | | | |
| $i-C_4$ | 0.62 | 0.47 | 1.50 |
| $n-C_4$ | 0.23 | 0.30 | .31 |
| $i-C_5$ | 67.73 | 72.50 | 73.30 |
| $n-C_5$ | 31.30 | 26.76 | 25.38 |
| $C_5^=$ | .14 | | .37 |
| $n-C_6$ | | | |
| Conversion to $i-C_5$% | 67.84 | 72.62 | 73.43 |
| Selectivity, $i-C_5$% | 98.98 | 99.35 | 98.57 |

It is claimed:
1. A method for manufacturing an active catalyst composition including about 0.01 to 2 percent of a platinum group noble metal, about 5 to 50 percent of an aluminum halide, and about 40 to 95 percent of an activated alumina, the steps comprising mixing under substantially anhydrous conditions a noble metal-activated alumina composition, a lower alkyl aluminum compound, and a non-aqueous solvent for the lower alkyl aluminum compound at temperatures from about 40° F. to 350° F. to form a mixture and contacting the mixture with halogenating agent to convert alkyl aluminum to aluminum halide and produce the noble metal-aluminum halide-activated alumina catalyst.

2. A method for manufacturing an active catalyst composition consisting essentially of about 0.01 to 2 percent of a platinum group noble metal, about 5 to 50 percent of aluminum halide, and about 40 to 95 percent of an activated alumina wherein the aluminum halide is prepared in the presence of the noble metal-alumina composition, the steps comprising mixing the noble metal-alumina composition, a lower alkyl aluminum compound and a non-aqueous solvent for the lower alkyl aluminum compound at temperatures from about 40° F. to 350° F. to form a mixture, contacting the mixture with halogenating agent at temperatures from about −20° F. to 500° F. to produce the noble metal-aluminum halide-activated alumina composition, and heating the composition in the presence of a non-oxidizing gas, at temperatures from about 400° F. to 700° F.

3. A method for manufacturing an active catalyst composition including about 0.01 to 2 percent of a platinum group noble metal, about 5 to 50 percent of aluminum halide, and about 40 to 95 percent of an activated alumina wherein the aluminum halide is prepared in the presence of the noble metal-alumina composition, the steps comprising placing the noble metal-alumina composition under vacuum, adding a non-aqueous solvent for a lower alkyl aluminum compound to the noble metal-alumina composition at temperatures from about 40° F. to 350° F., breaking the vacuum, adding a lower alkyl aluminum compound to form a mixture, and contacting the mixture with halogenating agent to produce the noble metal-aluminum halide-alumina composition.

4. The method of claim 3 wherein the lower alkyl aluminum compound is aluminum sesquihalide.

5. A method for manufacturing an active catalyst composition including about 0.01 to 2% of platinum, about 5 to 50% of aluminum chloride and about 40 to 95% of an activated alumina, the steps comprising mixing under substantially anhydrous conditions of platinum-activated alumina compositions, lower alkyl aluminum, and a paraffinic hydrocarbon solvent for the lower alkyl aluminum at temperatures from about 40 to 350° F. to form a mixture and contacting the mixture with hydrogen chloride to convert the lower alkyl aluminum to aluminum chloride and produce the platinum-aluminum chloride-activated alumina catalyst.

6. A method for manufacturing an active catalyst composition including about 0.01 to 2 percent of platinum, about 5 to 50 percent of aluminum halide and about 40 to 95 percent of an activated alumina, the steps comprising mixing under substantially anhydrous conditions a platinum-activated alumina composition, aluminum isobutyl, and hexane solvent for the aluminum isobutyl at temperatures from about 40° F. to 350° F. to form a mixture and contacting the mixture with hydrogen halide to convert the aluminum isobutyl to aluminum halide and produce the platinum-aluminum halide activated alumina catalyst.

7. The method of claim 6 wherein the hydrogen halide is hydrogen chloride and the hydrogen chloride converts the aluminum isobutyl to aluminum chloride.

8. A method for manufacturing an active catalyst composition including about 0.01 to 2 percent of platinum, about 5 to 50 percent of aluminum halide and about 40 to 95 percent of an activated alumina, the steps comprising mixing under substantially anhydrous conditions a platinum-activated alumina composition, aluminum-sesquihalide, and hexane solvent for the aluminum-sesquihalide, at temperatures from about 40° F. to 350° F. to form a mixture, and contacting the mixture with hydrogen halide to convert the aluminum-sesquihalide to aluminum halide and produce the platinum-aluminum halide-activated alumina catalyst.

9. The method of claim 8 wherein the hydrogen halide is hydrogen chloride and the hydrogen chloride converts the aluminum sesquihalide to aluminum chloride.

10. A method for manufacturing an active catalyst composition including about 0.01 to 2 percent of platinum, about 5 to 50 percent of aluminum chloride, and about 40 to 95 percent of an activated alumina wherein the aluminum chloride is prepared in the presence of noble metal on alumina composition, the steps comprising placing the platinum-alumina composition under vacuum, adding a solution of aluminum sesquichloride in dry hexane to the platinum-alumina composition, breaking the vacuum, and contacting the mixture with hydrogen chloride to produce the platinum-aluminum chloride-alumina composition.

References Cited in the file of this patent

UNITED STATES PATENTS 2,840,527     Brennan et al.  ---------- June 24, 1958